US011938600B2

(12) United States Patent
Kuter-Arnebeck et al.

(10) Patent No.: US 11,938,600 B2
(45) Date of Patent: Mar. 26, 2024

(54) AXIAL PLIERS

(71) Applicant: Snap-on Incorporated, Kenosha, WI (US)

(72) Inventors: Ottoleo Kuter-Arnebeck, Kenosha, WI (US); Rupak K. Paul, Williams Bay, WI (US)

(73) Assignee: Snap-on Incorporated, Kenosha, WI (US)

( * ) Notice: Subject to any disclaimer, the term of this patent is extended or adjusted under 35 U.S.C. 154(b) by 125 days.

(21) Appl. No.: 16/601,927

(22) Filed: Oct. 15, 2019

(65) Prior Publication Data

US 2020/0139515 A1 May 7, 2020

Related U.S. Application Data

(60) Provisional application No. 62/754,772, filed on Nov. 2, 2018.

(51) Int. Cl.

*B25B 7/02* (2006.01)
*B25B 7/10* (2006.01)
*B25B 27/18* (2006.01)

(52) U.S. Cl.

CPC *B25B 7/02* (2013.01); *B25B 7/10* (2013.01); *B25B 27/18* (2013.01)

(58) Field of Classification Search

CPC .............. B25B 7/02; B25B 7/10; B25B 27/18

See application file for complete search history.

(56) References Cited

U.S. PATENT DOCUMENTS

| | | | | | |
|---|---|---|---|---|---|
| 272,573 | A * | 2/1883 | Mihan | B25B 7/02 | 81/186 |
| 273,382 | A | 3/1883 | Packham | | |
| 636,587 | A | 11/1899 | Sylvester | | |
| 1,116,093 | A * | 11/1914 | McKaig, Sr. | B25B 7/02 | 7/134 |
| 1,300,495 | A | 4/1919 | Shank | | |
| 1,517,162 | A | 11/1924 | King | | |
| 1,874,944 | A | 8/1932 | Fabian | | |
| 1,902,913 | A | 3/1933 | Sievern | | |
| 2,098,369 | A | 11/1937 | Baash | | |

(Continued)

FOREIGN PATENT DOCUMENTS

| | | | |
|---|---|---|---|
| CN | 101432101 | A | 5/2009 |
| CN | 101804605 | A | 8/2010 |

(Continued)

OTHER PUBLICATIONS

Examination Report for Application No. 2019257518 dated Oct. 16, 2020, 5 pages.

(Continued)

*Primary Examiner* — Hadi Shakeri

(74) *Attorney, Agent, or Firm* — Seyfarth Shaw LLP

(57) ABSTRACT

A tool having gripping jaw teeth that provide a contact pattern for engaging fasteners on-axis. The gripping teeth are formed in a depression disposed at a distal end of a jaw and are oriented at an angle that turns away from a major axis of the tool or an axis that is orthogonal to a plane formed by a front face of the jaw to increase the gripping force that can be applied to the fastener before the tool disengages or "slips against" the fastener.

22 Claims, 8 Drawing Sheets

(56) References Cited

U.S. PATENT DOCUMENTS

| | | | | | |
|---|---|---|---|---|---|
| 2,493,941 | A * | 1/1950 | Belden | H02G 1/1297 30/90.2 |
| 2,618,994 | A | 11/1952 | Frazee | |
| 2,760,395 | A | 8/1956 | St. Pierre | |
| 2,847,889 | A * | 8/1958 | Cain | B25B 7/02 81/417 |
| 2,873,636 | A | 2/1959 | Sherman | |
| 2,962,919 | A | 12/1960 | Grundmann et al. | |
| 3,107,424 | A | 10/1963 | Stacawicz | |
| 4,318,316 | A * | 3/1982 | Guilliams | B25B 7/02 81/367 |
| 5,572,914 | A | 11/1996 | Coleman | |
| 5,833,697 | A * | 11/1998 | Ludwick | A61B 17/062 606/147 |
| 5,865,072 | A | 2/1999 | Jerdee | |
| 6,923,097 | B2 | 8/2005 | Takasaki | |
| 7,124,786 | B1 | 10/2006 | Gowhari | |
| 7,234,377 | B2 | 6/2007 | Wolfson | |
| 8,607,670 | B2 * | 12/2013 | Stawarski | B25B 27/18 81/53.2 |
| 8,622,096 | B2 | 1/2014 | Yang | |
| 8,656,812 | B2 | 2/2014 | Kawai et al. | |
| 8,677,865 | B2 | 3/2014 | Buchanan | |
| 10,960,519 | B2 * | 3/2021 | Wu | B25B 7/02 |
| 2003/0233915 | A1 | 12/2003 | Takasaki | |
| 2005/0235786 | A1 | 10/2005 | Yueh-Chiang | |
| 2008/0229651 | A1 | 9/2008 | Broadnax | |
| 2012/0000019 | A1 * | 1/2012 | Steele | B25B 7/22 7/107 |
| 2016/0184980 | A1 | 6/2016 | Takasaki et al. | |
| 2020/0223033 | A1 * | 7/2020 | Blumenthal | B25B 7/14 |

FOREIGN PATENT DOCUMENTS

| | | | |
|---|---|---|---|
| CN | 201544178 | U | 8/2010 |
| CN | 202123444 | U | 1/2012 |
| CN | 102365152 | A | 2/2012 |
| CN | 202446247 | U | 9/2012 |
| CN | 204772158 | U | 11/2015 |
| CN | 207155603 | U | 3/2018 |
| CN | 207155714 | U | 3/2018 |
| CN | 207824726 | U | 9/2018 |
| CN | 207953622 | U | 10/2018 |
| CN | 207971853 | U | 10/2018 |
| EP | 2436488 | A1 | 4/2012 |
| GB | 149396 | A | 8/1920 |
| JP | 2004330348 | A | 11/2004 |
| JP | 2005279801 | A | 10/2005 |
| JP | 6254322 | B1 | 12/2017 |
| JP | 2018144189 | A | 9/2018 |
| WO | 2019003591 | A | 4/2018 |
| WO | 2018163849 | A1 | 9/2018 |

OTHER PUBLICATIONS

Chinese Office Action for corresponding Chinese Application No. 11020480980 dated May 25, 2021, 14 pages.

Canadian Office Action for Application No. 3,059,697 dated Feb. 1, 2021, 5 pages.

Chinese Office Action for Application No. 201911060905.7 dated Feb. 22, 2021, 11 pages.

Examination Report for Application No. 2019257518 dated Apr. 12, 2021, 4 pages.

Combined Search and Examinatin Report for Application No. GB1915445.9 dated Apr. 1, 2020, 8 pages.

Australian Examination Report No. 3 for corresponding AU Application No. 2019257518, dated Oct. 1, 2021, 3 pages.

Canadian Office Action for corresponding Application No. 3059697 dated Sep. 28, 2021, 6 pages.

Chinese Office Action for corresponding Application No. 11020998080 dated Oct. 15, 2021, 5 pages.

United Kingdom Examination Report for corresponding Application No. GB1915445.9, dated Dec. 1, 2021, 6 pages.

Chinese Office Action for corresponding Application No. 201911060905.7, dated Nov. 2, 2021, 10 pages.

United Kingdom Combined Search and Examination Report for corresponding Application No. GB2203878.0, dated Aug. 19, 2022, 7 pages.

Examination Report No. 1 for corresponding Australian Application No. 2022200768 dated Mar. 8, 2023, 3 pages.

Chinese Office Action for corresponding CN Application No. 2022109304204, dated Apr. 13, 2023, 9 pages.

* cited by examiner

AXIAL PLIERS

CROSS REFERENCES TO RELATED APPLICATIONS

This application claims priority to, and the benefit of, U.S. Provisional Patent Application Ser. No. 62/754,772, filed Nov. 2, 2018, the contents of which are incorporated herein by reference in their entirety.

TECHNICAL FIELD OF THE INVENTION

The present invention relates generally to tools, such as pliers. More particularly, the present invention relates to a tool with jaw teeth geometry adapted to grip a work piece, such as a fastener head.

BACKGROUND OF THE INVENTION

A typical problem encountered in the auto repair or carpentry trades is fasteners, such as, for example, pan head screws, socket head cap screws, and hex head bolts and nuts, that have been stripped out or rounded off, which thus make application of torque to such fasteners difficult. In such a case, pliers can be used to remove the stripped fastener by apply a large amount of clamping force, wherein the jaw teeth dig into the fastener. However, this typically causes additional stripping of the fastener, or if the fastener is too stripped or rounder, this does not work. Another option is to use a bolt extractor tool, if available and present. However, bolt extractor tools are typically size dependent, and thus require a plurality of different sizes. Also, use of bolt extractor tools are limited to specific types of fasteners as well.

For fasteners that are offset from the surface, such as hex head bolts or socket head cap screws, a socket-type tool with an interior diameter of spiraled teeth has been used. However, the effectiveness of this tool is determined by the available engagement area on the fastener. Likewise, these tools are fastener size dependent as well, thus a plurality of differently sized removal tools are required. For other types of low-profile fasteners, such as pan head screws, a bolt extractor with spiraled teeth on the outside of the diameter has been used. However, this tool requires that a hole is drilled into the fastener and many sizes of extractors must be kept on hand for various sized fasteners.

Another example of a tool used to remove stripped screws and bolts is locking pliers with a four-bar linkage is able to generate a large amount of clamping force on the fastener head. Locking pliers are best engaged to the fastener by being aligned orthogonal to the fastener axis but may be also used by engaging the tool axially with the fastener. However, locking pliers are best suited for larger diameter screws and bolts and may not work for pan head screws or fasteners with a sloped head.

Another example of pliers adapted to remove stripped screws and bolts is embodied in the 612AEP pliers, manufactured by Snap-on Incorporated of Kenosha, Wisconsin, where a set of teeth are oriented along the pliers axis and which start at the front face. These teeth are set on an arc such that when the pliers' jaws are closed, the teeth form a round hole, as shown.

Another example of pliers adapted to remove stripped-out screws and bolts is disclosed in U.S. Pat. Nos. 6,923,097 and 8,656,812. These patents disclose pliers having a "vamplier" design that includes a set of teeth oriented along the pliers' axis, in a manner similar to the 612AEP design, and are formed at an angle away from the neutral plane of the closed jaws. Accordingly, a sloped tunnel is formed or the teeth lie on a radius such that a concave shape is formed in the jaw surface.

SUMMARY OF THE INVENTION

The present invention broadly comprises a tool, such as pliers, having a jaw tooth geometry adapted to enhance gripping of fasteners, such as screws, pins, bolts, and nuts, when the axis of rotation of the fastener is substantially parallel with a major axis of the tool. In other words, the tooth geometry improves the grip on a fastener when the engagement is such that the axis of rotation of the fastener is orthogonal to the plane that defines the front of the jaws of the pliers. The tooth geometry can include a gripping pattern that enhances gripping with a fastener, where the normal force is oriented close to, or past orthogonal to, the axis of rotation of the fastener, so that the fastener can be engaged with the tool end-on and turned and/or pulled by the tool.

In an embodiment, the gripping pattern can be cut on a radius into a front of the jaws of the pliers. From the front, the gripping pattern may extend towards a back of the gripping area and veer off an axis at an angle. In an embodiment, the gripping pattern can follow a curve from the front of the jaws to the back of the gripping pattern, such that the teeth are on a radius where the center of the radius is set a distance from the front of the jaws. The teeth may be disposed on a depression, which is dished in two orthogonal directions where neither axis aligns with any major feature of the pliers, that starts at the front face of the jaw and terminates at a distance defined by a front to back dish radius starting point. Where the dished area meets the front edge/plane of the jaws, the center point of the depression may be equidistant from both sides of the jaws.

For example, the present invention broadly includes a tool. The tool includes first and second halves pivotally coupled together and a grip portion including a surface with a depression. The surface has a first set of teeth disposed on the depression. The first set of teeth abut a front face of the grip portion and extend away from the front face at an angle that is offset from a major axis of the tool.

The present invention can further broadly comprise a tool that includes a handle portion having a first axis that is substantially perpendicular to a front face of the tool, and a grip portion adapted to engage a fastener and having a first set of teeth disposed on a surface with a depression that follows a first curve that is in a first plane and a second curve that is in a second plane. The first set of teeth abut the front face and extend away from the front face at an angle that is offset from the first axis.

The present invention can further broadly comprise a pliers-type tool. The pliers-type tool including a first half that includes a first handle portion, a first joint portion having an aperture adapted to receive a fastener, and a first grip portion including a first surface with a first depression, the first surface having a first set of teeth disposed on the first depression, wherein the first set of teeth abut a front face of the pliers-type tool and extend away from the front face at a first angle that is offset from a major axis of the pliers-type tool. The pliers-type tool further including a second half that includes a second handle portion, a second joint portion having a slot adapted to receive the fastener to couple the first and second halves, and a second grip portion including a second surface with a second depression, the second surface having a second set of teeth disposed on the second depression, wherein the second set of teeth abut the front face and extend away from the front face at a second angle that is offset from the major axis.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
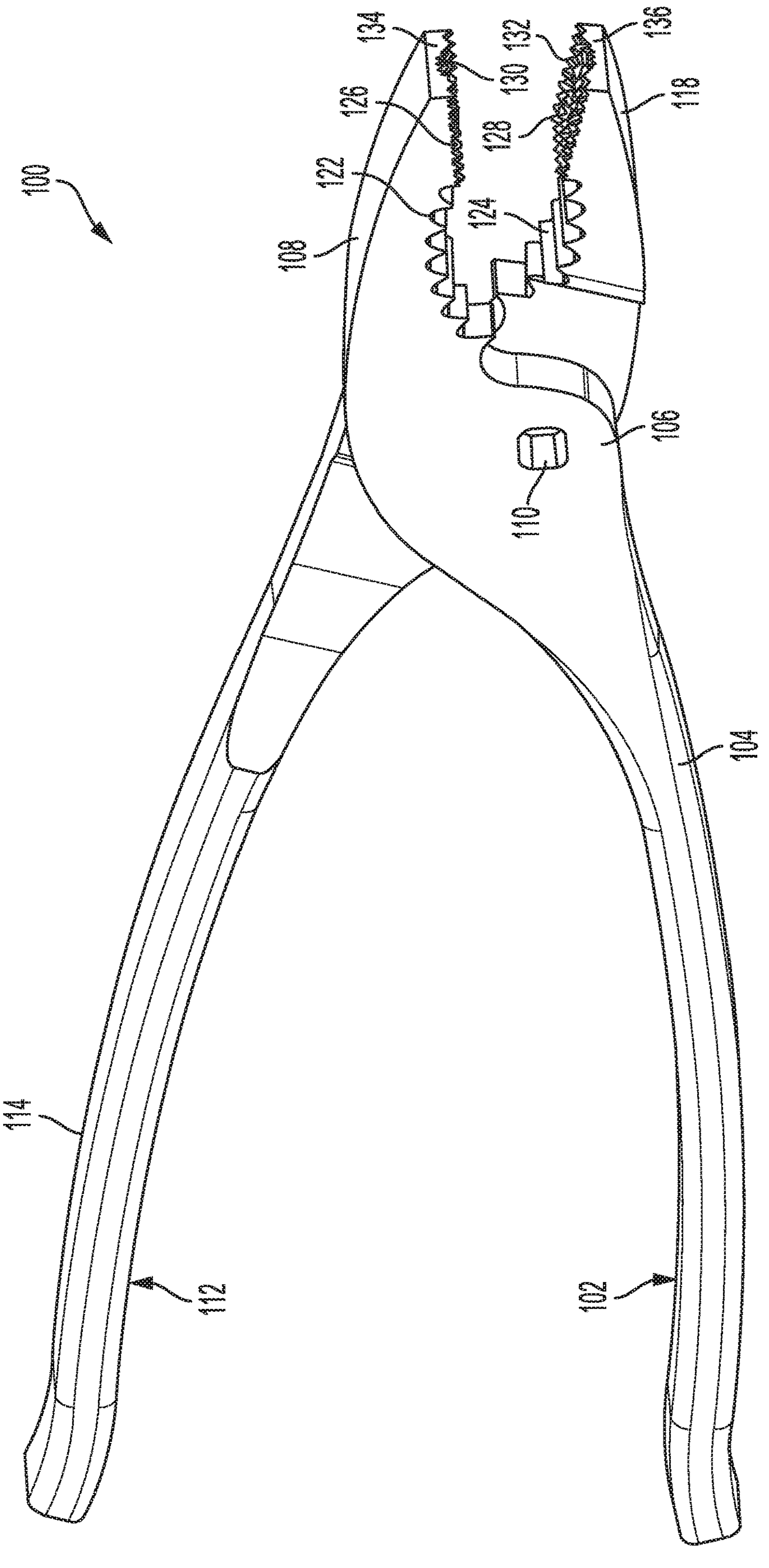
FIG. 1 is a side, perspective view of a tool according to an embodiment of the present invention.
Figure 2:
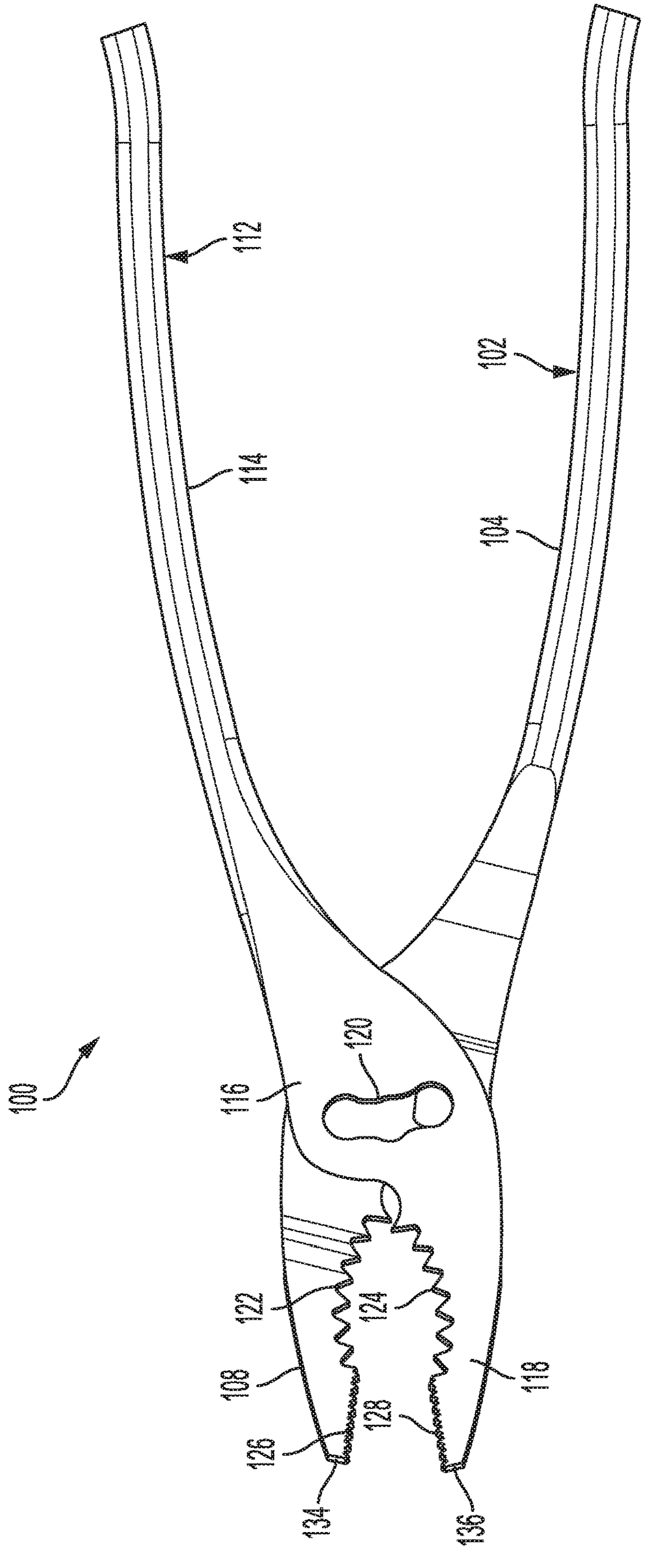
FIG. 2 is a side plan view of the tool of FIG. 1.
Figure 3:
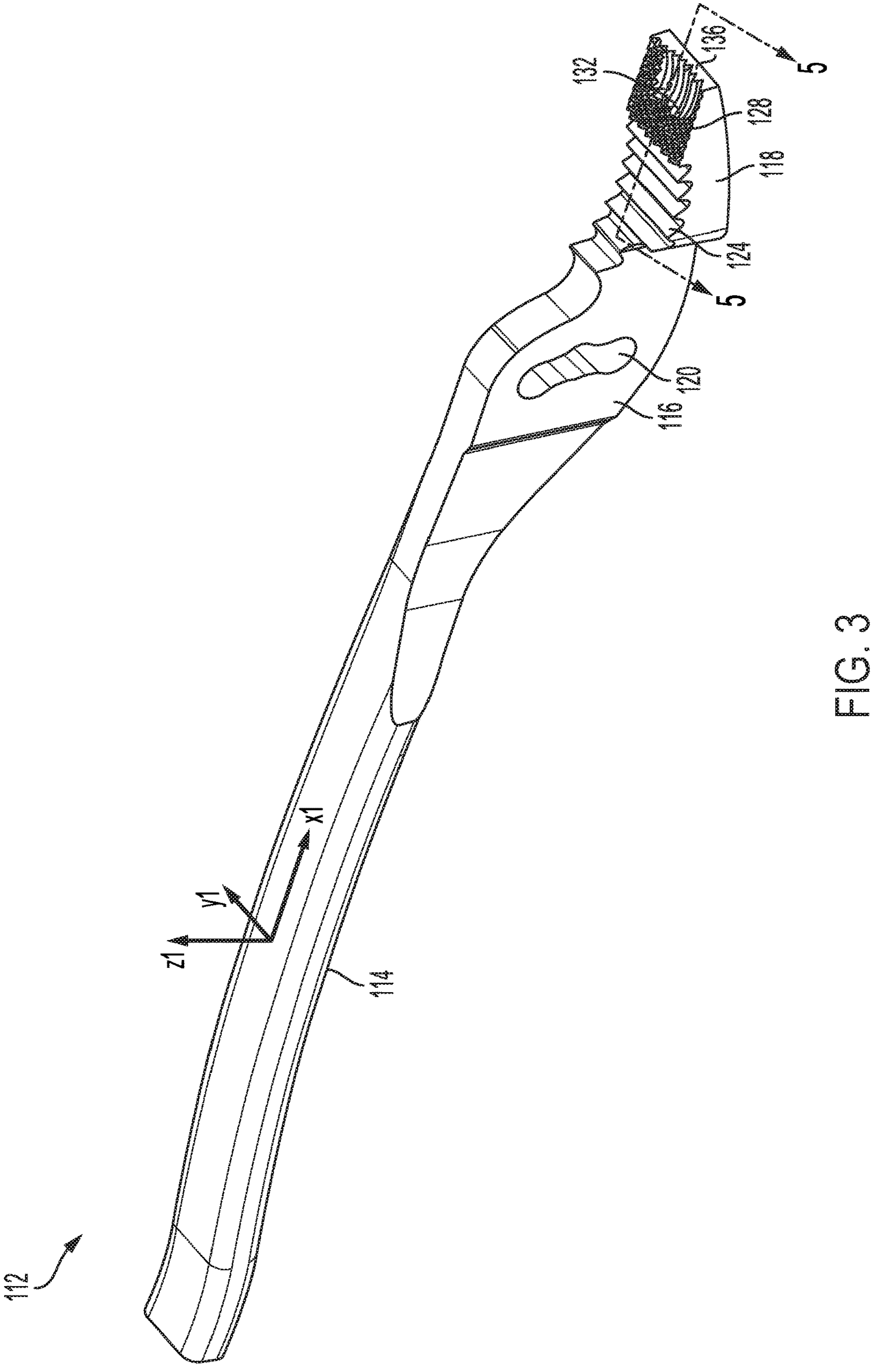
FIG. 3 is a side, perspective view of one half of the tool of FIG. 1 in a disassembled condition.
Figure 4:
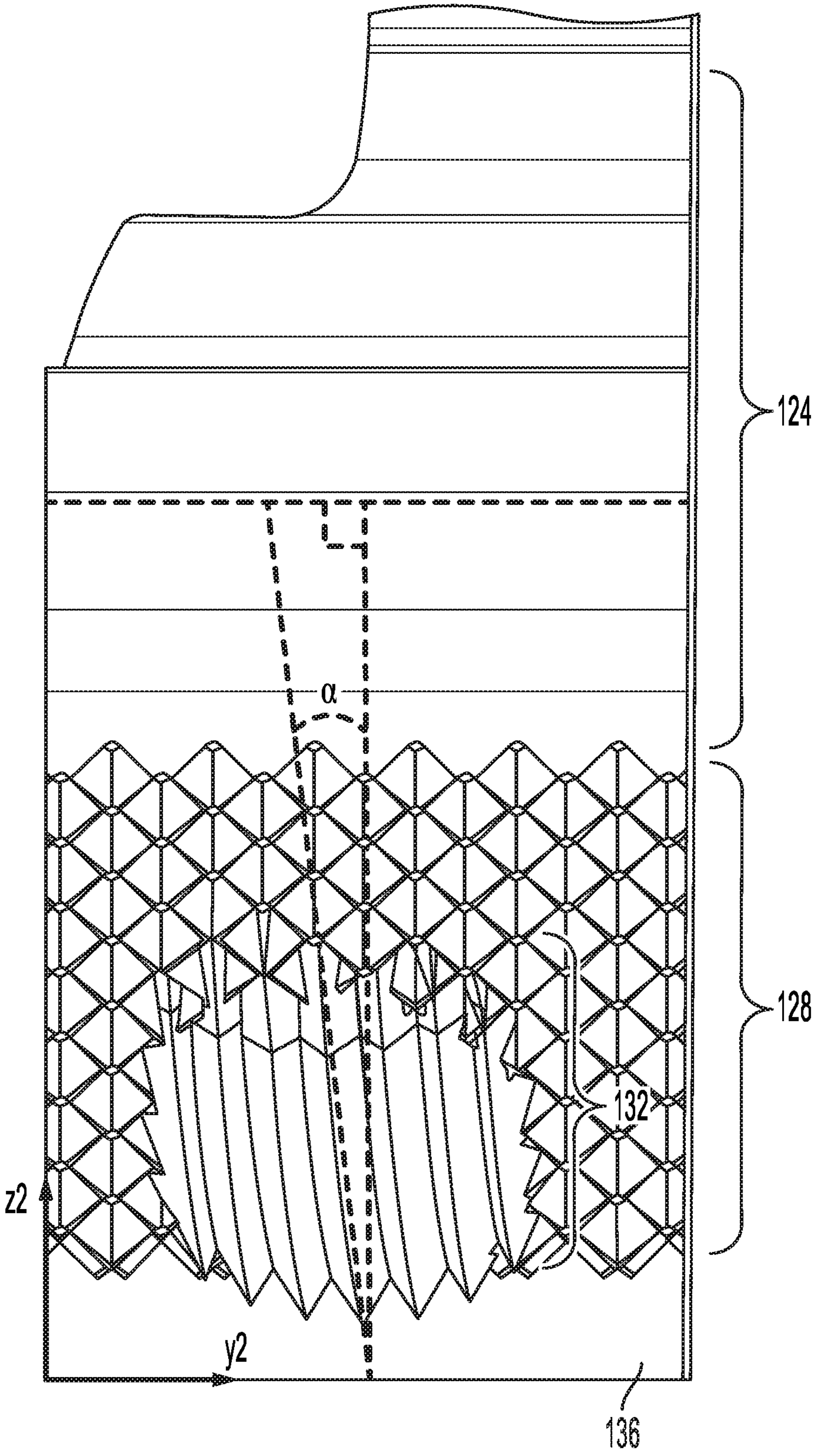
FIG. 4 is an enlarged, partial view of a tool jaw of the tool of FIG. 1.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention broadly comprises a tool, such as pliers, having gripping jaw teeth that provide an enhanced contact pattern over the prior art for engaging fasteners, such as screws, pins, bolts, stripped fasteners, and other round or near round fasteners when engaging the fastener on-axis. The gripping teeth may be formed in a dished area disposed at a distal end of a jaw of the pliers and are oriented at an angle that turns away from a major axis of the pliers and/or an axis that is orthogonal to a plane formed by a front face of the jaws. The angle and greater contact area enhances the amount of torque that can be applied to the fastener before the tool disengages or "slips against" the fastener, compared to the prior art tools.

Referring to FIGS. 1-8, a tool 100, such as pliers, includes a first portion 102. The first 102 portion includes a handle portion 104, a joint portion 106, and a grip portion 108 (also referred to as a jaw). The first portion can include an aperture 110. The aperture 110 may be disposed in the joint portion 106. The pliers also include a second portion 112 that may include a handle portion 114, a joint portion 116, and a grip portion 118. In an embodiment, the second portion 112 may include a slot 120 adapted to pivotally couple with the aperture 110 in the first portion 102 via a fastener, such as a screw, pin, or rivet, thus allowing the first and second portions to be pivotal relative to each other. The slot 120 can further allow the opening between the first and second gripping portions 108 to change, by moving or sliding the first portion 102 relative to the second portion 112 along the slot 120. The tool 100 may be any of the variety of tools in the family of pliers, such as locking pliers, water pump pliers, linesman pliers, or the like, in which a tool is composed of at least a gripping section, a pivot point, and handles and where force is amplified by the ratio of the length of the handles to the length of the jaws about the pivot point. Embodiments of the invention disclosed herein embody the fastener-gripping portion (i.e., jaws) of any such pliers.

The gripping portions 108, 118 may include respective first tooth regions 122, 124 and second tooth regions 126, 128, with differing tooth patterns. In an embodiment, an axis system [x1, y1, z1] can be aligned with the respective handle portions 104, 114. However, the axis system is not limited to being aligned with the handle portions 104, 114 and can be aligned in any desired alignment relative to the handle portions 104, 114. Teeth in the second tooth regions 126, 128 can be cut along the major 'y1' axis and formed in the [x1 y1] plane as a grid pattern. In another embodiment, the teeth in the second tooth regions 126, 128 may not be aligned with the axis system.

Figure 5:
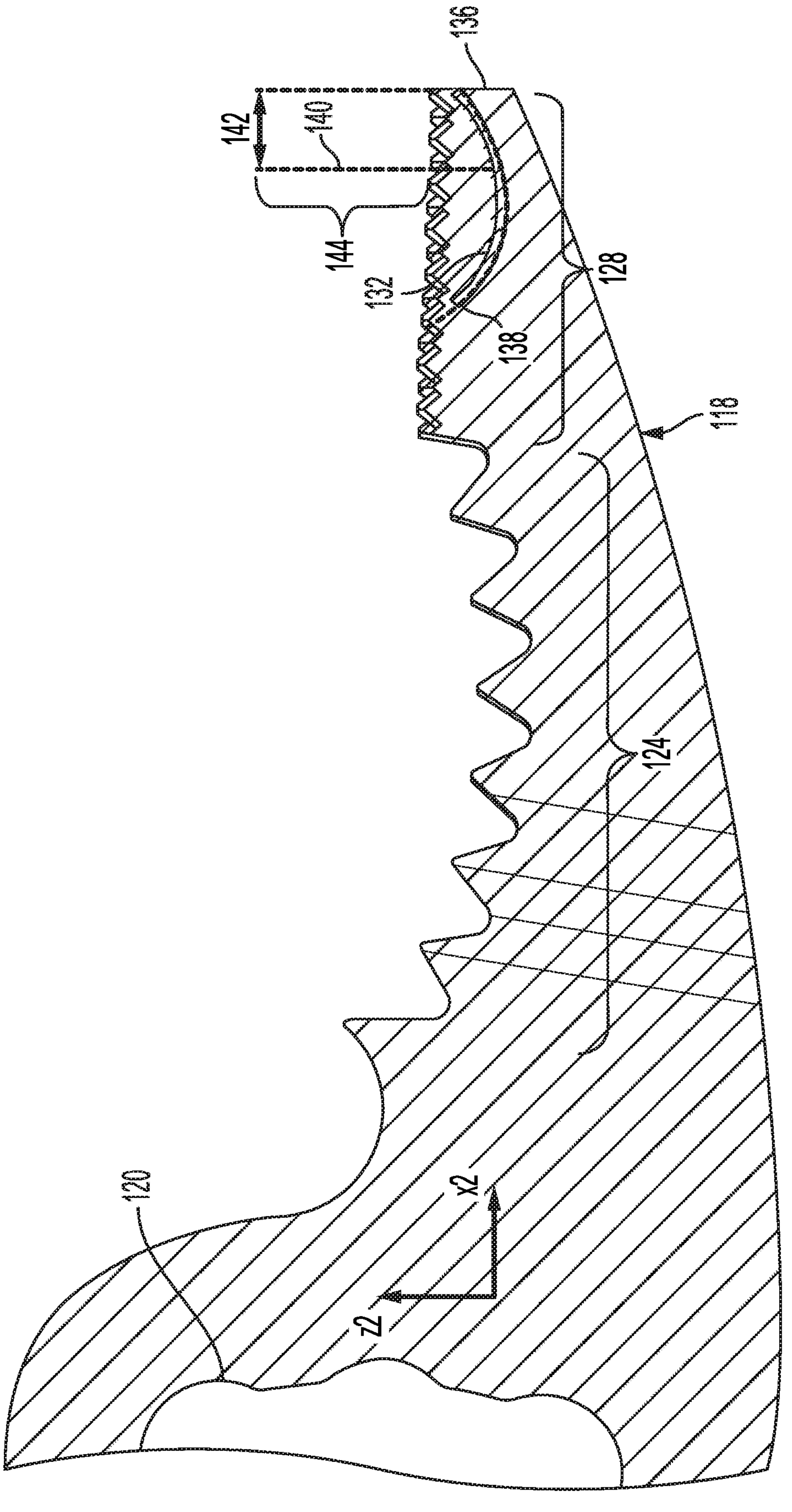
FIG. 5 is a section view of a tool jaw of the tool of FIG. 1 taken along line 5-5 of FIG. 3.

Referring to FIG. 5, another axis system [x2, y2, z2] can define the grip portions 108, 118 where the plane [y2 z2] defines the front faces 134, 136 of the respective grip portions 108, 118 and where the x2 axis is orthogonal to this plane. Alternately, the plane [y2 z2] may not define the front faces 134, 136 such that the x2 axis is at an angle relative to the front faces 134, 136. The coordinate system defining the respective grip portions 108, 118 may or may not be aligned with the handle coordinate system [x1, y1, z1].

The surface of the second tooth regions 126, 128 can have respective depressions 130, 132 (also referred to as a concave bowl). The teeth disposed on the depressions 130, 132 can abut respective front faces 134, 136 of the grip portions 108, 118 and extend towards the joint portions 106, 116 at an angle offset from the major 'x1' and/or 'x2' axes of the pliers at an angle $\alpha$. The teeth disposed on the depressions 130, 132 may be cut in a continuous pattern, as illustrated, or cross-hatched such that an array of teeth are formed in a grid pattern.

Figure 7:
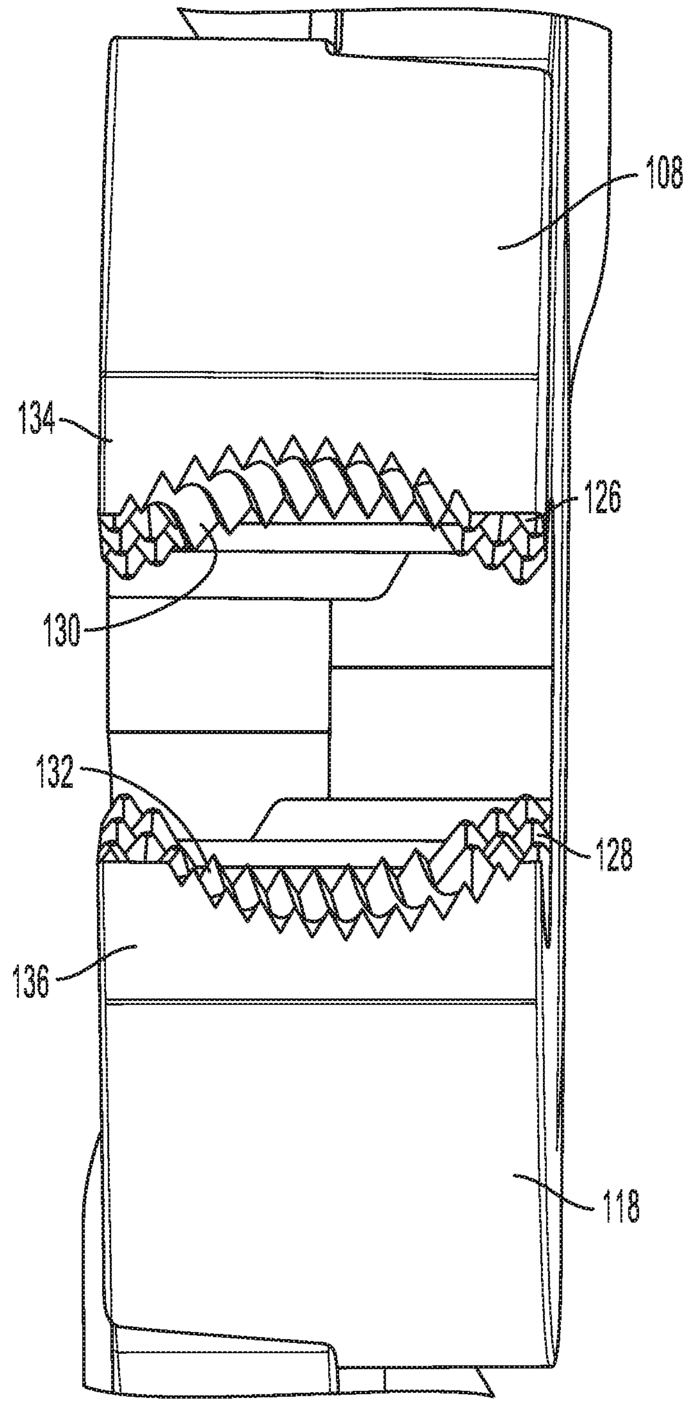
FIG. 7 is a plan view of the front of a tool, according to an embodiment of the present invention.
Figure 8:
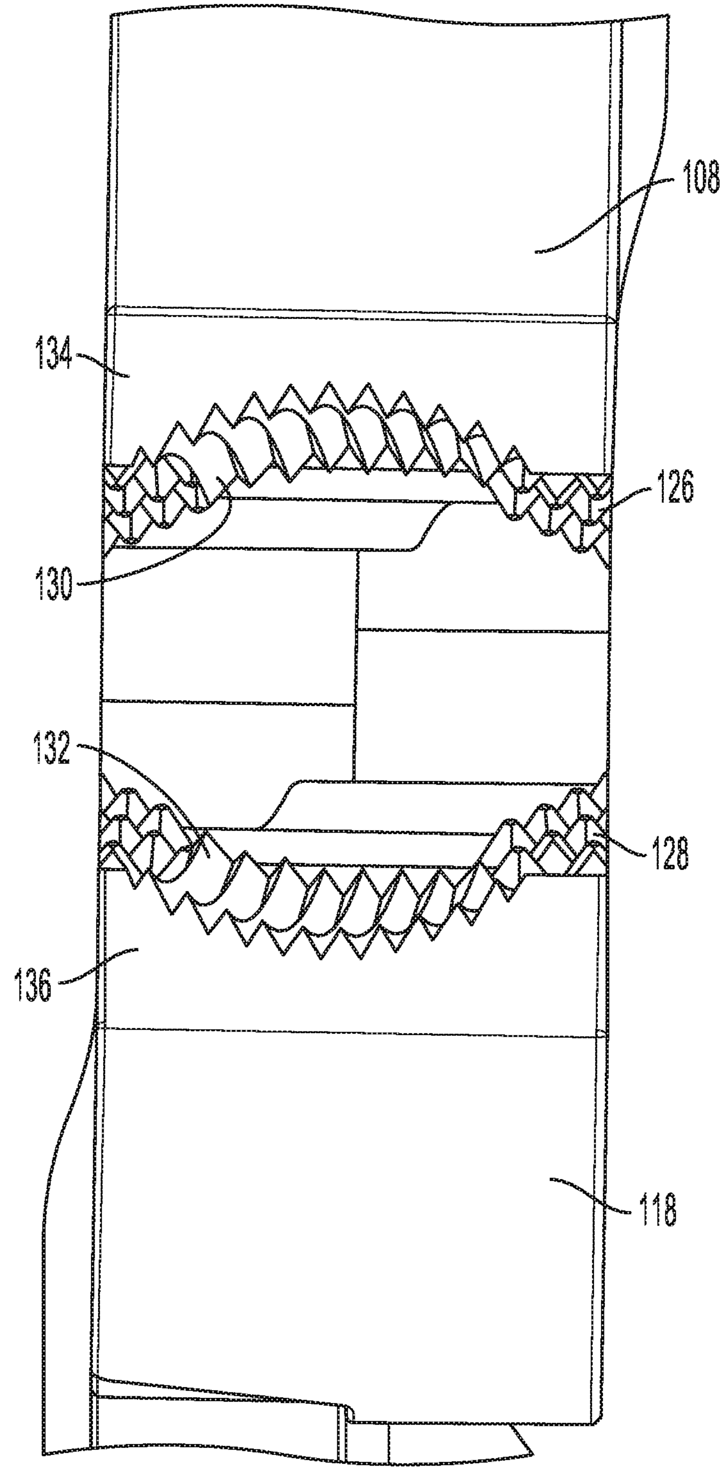
FIG. 8 is a plan view of the front of a tool, according to an embodiment of the present invention.

In an embodiment, angle $\alpha$ may range from about 1° to about 15° off of the x1 and/or the x2 axes. For example, the angle $\alpha$ may range from about 1° to 10°, 2° to 7°, 3° to 8°, etc. off of the x1 and/or x2 axes. Preferably, angle $\alpha$ is 5° off of the x1 and/or the x2 axes. Referring to FIG. 7, the teeth disposed in the respective depressions 130, 132 of the respective first and second portions 102, 112 may have substantially same angle $\alpha$, such that when the tool 100 is in a closed state, the teeth disposed in the depressions 130, 132 of the respective first and second portions 102, 112, form a substantial spiral or helical pattern. The spiral or helical pattern of the teeth has been found to cause the tool 100 to be further pulled onto a fastener when the tool 100 is rotated about an axis of rotation of the fastener. In an embodiment, angle $\alpha$ may be positive or negative, depending on the direction of rotation (e.g., clockwise or counter-clockwise) required to rotate the tool 100 to engage the fastener. Alternately, as illustrated in FIG. 8, the teeth disposed in the respective depressions 130, 132 of the respective first and second portions 102, 112 may have opposing angles $\alpha$, such that when the tool 100 is in a substantially closed condition, the teeth disposed in the respective depressions 130, 132 of the respective first and second portions 102, 112, form a substantially identical pattern.

The inventors of the present invention conducted extensive testing of tools according to embodiments of the present invention and compared it to results of the same testing conducted on a typical pliers tool having a "vamplier" design (indicated as "prior art" in the tables below). A first tool according to an embodiment of the present invention had an angle $\alpha$ of 0° was tested ("Tool 1, $\alpha$=0°"), a second tool according to an embodiment of the present invention had an angle $\alpha$ of 2° ("Tool 2, $\alpha$=2°"), and a third tool according to an embodiment of the present invention had an angle $\alpha$ of 5° ("Tool 3, $\alpha$=5°"). As shown by the following testing, the embodiments of the present invention are able to apply more rotational force (torque) to an indicated fastener before slipping off, compared to typical pliers having a "vamplier" design.

TABLE 1

Fastener: 3/16 socket head capscrew (0.37" outside diameter)

| Tested Tool | Normalized Average of Max Torque to Slip (%) |
|---|---|
| Prior Art | 100.0 |
| Tool 1 $\alpha$ = 0° | 107.3 |
| Tool 2 $\alpha$ = 2° | 120.1 |
| Tool 3 $\alpha$ = 5° | 121.1 |

TABLE 2

Fastener: 18-8 SS 5/8 panhead screw (0.475" outside diameter)

| Tested Tool | Normalized Average of Max Torque to Slip (%) |
|---|---|
| Prior Art | 100.0 |
| Tool 1 $\alpha$ = 0° | 114.6 |
| Tool 2 $\alpha$ = 2° | 109.5 |
| Tool 3 $\alpha$ = 5° | 117.4 |

The above tables show the normalized average, represented as a percentage, of the maximum amounts of torque applied to the indicated fasteners during testing of the tools according to embodiments of the present invention having various angles $\alpha$ compared to a typical pliers design. As compared to the typical pliers design, the present invention tool 100 can apply more rotational force before slipping off the fastener, thereby enhancing the ability to remove damaged fasteners, such as, for example, stripped out fasteners.

Referring to FIG. 5, the teeth disposed in the respective depressions 130, 132 may be cut along a first curve 138 in a plane that defines the respective depressions 130, 132, thereby forming a substantially concave dish. The plane may be disposed at an angle such that it is not parallel to the x1 and/or the x2 axes. Alternately, the plane may be parallel to the x1 and/or the x2 axes. The first curve 138 may be defined by a radius 140. The length of the depressions 130, 132 is defined by a distance 142 that a center of origin of the radius 140 is from the front faces 134, 136 of the respective grip portions 108, 118, and by a distance 144 of the origin of the radius 140 above the grip portions 108, 118. Alternately, the first curve 138 may follow a parabolic or spline path or may follow a straight-line path.

Figure 6:
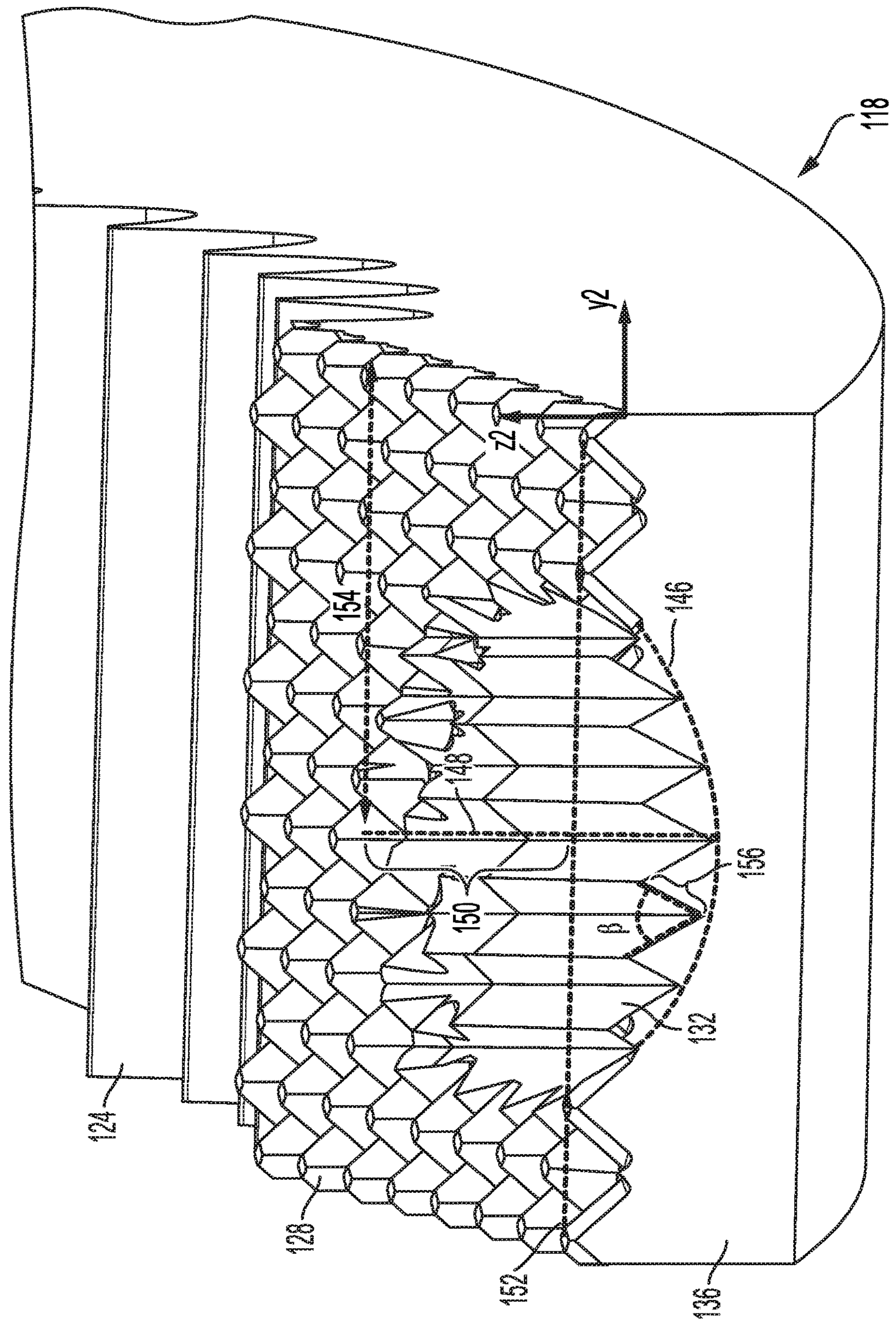
FIG. 6 is an enlarged, perspective view of a tool jaw of the tool of FIG. 1.

Referring to FIG. 6, a second curve 146 can further define the respective depressions 130, 132 and is defined by a radius 148. The second curve 146 may be disposed at an angle such that the second curve 146 is on a plane that is not orthogonal or perpendicular to the x1 and/or the x2 axes. Alternately, the second curve 146 may be on a plane that is orthogonal or perpendicular to the x1 and/or the x2 axes. The origin of the radius 148 may be set at a distance 150 above a surface of the grip portions 108, 118, which is illustrated by line 152, and at a distance 154 from an edge of the grip portions 108, 118, such that the teeth disposed in the respective depressions 130, 132 are substantially symmetrically disposed in the front faces 134, 136 of the respective grip portions 108, 118, where the cut of the depressions 130, 132 intersects the respective front faces 134, 136 of the grip portions 108, 118 in the [y2 z2] plane. The teeth in the depressions 130, 132 can be formed with a tooth angle $\beta$ and a tooth depth 156 to couple with a broad range of fasteners with different diameters and cross-sectional shapes.

In an embodiment, the tooth angle $\beta$ and tooth depth 156 are dependent on the radius 148 and the type and dimensions of fasteners to be coupled. Likewise, the radius 140 and the origin location of the first curve 138, as defined by distances 142 and 144, can be defined such that an optimal normal force is achieved for a range of fastener types and sizes. The tooth angle $\beta$ may range from about 20° to about 120° and is preferably 40°-70°. The teeth disposed in the depressions 130, 132 may be separated by a radius trench varying in radius from about 0.002 to about 0.01 inches, or a flat trench varying in length from about 0.002 to about 0.01 inches. The tooth depth 156 may range from about 0.005 inches to about 0.1 inches, preferably about 0.01 to about 0.07 inches. The radius 148 may range from about 0.04 inches to about 2 inches. In addition, the second curve 146 may be a complex curve, such as a parabolic or a spline, and may extend across the entire front faces 134, 136 of the respective grip portions 108, 118. In an embodiment, the second curve 146 may follow a straight line path. The distance 150 defining the depth of the cut for the second curve 146 may range from about 0.02 inches to about 2.1 inches. The difference of the distance 150 subtracted from the radius 148 can be between about 0.01 and about 0.2, but not so great that the thickness of the grip portions 108, 118 at its thinnest point is less than about 0.07 inches. The distance 154 may be about half of the grip portions 108, 118 width plus or minus about 0.2 inches to cause the depressions 130, 132 to be placed on or about the center of the grip portions 108, 118.

The radius 140 defining the first curve 138 may range from about 0.04 inches to about 2 inches. And the distance 144 defining the depth of the cut along the first curve 138 may range from about 0.02 inches to about 2.1 inches. The difference of the distance 144 subtracted from the radius 140 may be between about 0.01 and about 0.2, but not so great that the thickness of the grip portions 108, 118 at its thinnest point is less than about 0.07 inches. The distance 144 may range between about 0.002 inches and about seven-eighths of the radius 140. In an embodiment where the first curve 138 is a hyperbola, the distance 144 may range from about 0.002 inches to about 0.5 inches.

While aspects of the disclosure describe a tool having a grip portion delineated into three teeth sections, other configurations are possible. For example, a configuration can include the first tooth regions 122, 124 as a cutting section, or can exclude the first tooth regions 122, 124 such that the second tooth sections 126, 128 extends all the way the joint portions 106, 116. Further yet, the grip portions 108, 118 may be formed entirely of the depressions 130, 132, in other words a dish-shaped, single section jaw.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool having a longitudinal axis, the tool comprising:

first and second halves pivotally coupled together and pivotable about a pivot axis that is substantially perpendicular to the longitudinal axis;

a grip portion adapted to engage a work piece and including a surface with a depression that follows a first curve, the surface having a first set of elongated teeth disposed on the depression, wherein each tooth of the first set of elongated teeth abuts a front face of the grip portion and extends substantially across an entirety of the depression in a direction away from the front face and at a non-zero angle relative to a first plane, wherein the first plane is substantially parallel to the longitudinal axis, is substantially perpendicular to the pivot axis, and extends through the front face.

2. The tool of claim 1, wherein the grip portion is formed on respective ends of first and second handles.

3. The tool of claim 1, wherein the non-zero angle is between about 1° and about 15°.

4. The tool of claim 1, wherein the grip portion includes a second set of teeth disposed on the surface outside the depression.

5. The tool of claim 4, wherein the second set of teeth are cut along an axis substantially perpendicular to the longitudinal axis.

6. The tool of claim 4, wherein the grip portion includes a third set of teeth having a third tooth pattern that is different tooth than tooth patterns of the respective first and second sets of teeth.

7. The tool of claim 4, wherein the second set of teeth are cut in a grid pattern.

8. The tool of claim 1, wherein when the tool is in a closed state, the first set of teeth form a helical pattern.

9. The tool of claim 1, wherein the first curve is in the first plane.

10. The tool of claim 9, wherein the depression follows a second curve that is in a second plane substantially perpendicular to the longitudinal axis.

11. The tool of claim 1, further comprising first and second handles, wherein the longitudinal axis is substantially parallel to the first and second handles and substantially perpendicular to the front face of the grip portion.

12. The tool of claim 1, wherein the tool is a pliers-type tool.

13. The tool of claim 1, wherein the first set of elongated teeth are cut in a continuous pattern.

14. The tool of claim 1, wherein when the tool is in a closed state, the first set of elongated teeth form a mirrored pattern.

15. The tool of claim 1, wherein when the grip portion engages a work piece, the longitudinal axis is substantially parallel with an axis of rotation of the fastener.

16. The tool of claim 1, wherein the first curve is in a second plane that is at an angle relative to the first plane.

17. The tool of claim 16, wherein the depression follows a second curve that is in a third plane that is at an angle relative to the longitudinal axis.

18. A tool having a longitudinal axis and first and second portions pivotally coupled together, and are pivotable about a pivot axis that is substantially perpendicular to the longitudinal axis, the tool comprising:

a handle portion; and first and second grip portions adapted to cooperatively engage a fastener and respectively disposed on the first and second portions, each of the first and second grip portions having a front face that is substantially perpendicular to the longitudinal axis, a first set of elongated teeth disposed on a surface with a depression that follows a first curve that is in a first plane and a second curve that is in a second plane, wherein each tooth of the first set of elongated teeth abuts the front face and extends substantially across an entirety of the depression in a direction away from the front face and at a non-zero angle relative to a third plane, wherein the third plane is substantially parallel to the longitudinal axis, is substantially perpendicular to the pivot axis, and extends through the front faces of the respective first and second grip portions.

19. The tool of claim 18, wherein each of the first and second grip portions includes a second set of teeth disposed on the surface and cut along a second axis substantially perpendicular to the longitudinal axis.

20. A pliers-type tool having a longitudinal axis, the pliers-type tool comprising:

a first half including a first handle portion, a first joint portion having an aperture adapted to receive a fastener, and a first grip portion including a first surface with a first depression, the first surface having a first set of elongated teeth disposed on the first depression, wherein the first set of teeth abut a front face of the first grip portion that is substantially perpendicular to the longitudinal axis, and each tooth of the first set of elongated teeth extends substantially across an entirety of the first depression in a first direction away from the front face and at a first non-zero angle relative to a first plane; and a second half including a second handle portion, a second joint portion having a slot adapted to receive the fastener to couple the first and second halves about a pivot axis that is substantially perpendicular to the longitudinal axis, and a second grip portion including a second surface with a second depression, the second surface having a second set of elongated teeth disposed on the second depression, wherein the second set of elongated teeth abut a front face of the second grip portion that is substantially perpendicular to the longitudinal axis, and each tooth of the second set of teeth extends substantially across an entirety of the second depression in a second direction away from the front face of the second grip portion and at a second non-zero angle relative to the first plane, wherein the first plane is substantially parallel to the longitudinal axis, is substantially perpendicular to the pivot axis, and extends through the front faces of the respective first and second grip portions.

21. The pliers-type tool of claim 20, wherein the first and second non-zero angles are substantially the same.

22. The pliers-type tool of claim 20, wherein the first non-zero angle is greater than zero and the second non-zero angle is less than zero.

* * * * *